(12) United States Patent  (10) Patent No.: US 8,054,617 B2
Kuang et al.  (45) Date of Patent: Nov. 8, 2011

(54) DESKTOP COMPUTER AND METHOD FOR MANUFACTURING THE SAME

(75) Inventors: Yen Kuang, Taipei (TW); Chi-Sheng Yin, Taipei (TW); Jeffery Lai, Taipei (TW); Yen-De Wu, Taipei (TW); Tsai-Feng Hsiang, Taipei (TW); Chien-Hung Yeh, Taipei (TW); Chen-Han Sung, Taipei (TW); Chun-Kai Chiu, Taipei (TW)

(73) Assignee: Pegatron Corporation, Taipei (TW)

( * ) Notice: Subject to any disclaimer, the term of this patent is extended or adjusted under 35 U.S.C. 154(b) by 206 days.

(21) Appl. No.: 12/474,916

(22) Filed: May 29, 2009

(65) Prior Publication Data

US 2009/0303675 A1  Dec. 10, 2009

(30) Foreign Application Priority Data

Jun. 4, 2008  (TW) .............................. 97120822 A

(51) Int. Cl.
*G06F 1/16* (2006.01)
(52) U.S. Cl. .................. 361/679.22; D14/314
(58) Field of Classification Search ............ 361/679.22, 361/679.55, 679.56, 679.27, 679.26, 649.21; D14/314, 375; 345/169
See application file for complete search history.

(56) References Cited

U.S. PATENT DOCUMENTS

| | | | | |
|---|---|---|---|---|
| 5,128,829 A | * | 7/1992 | Loew | 361/679.3 |
| 5,247,285 A | * | 9/1993 | Yokota et al. | 361/679.17 |
| 6,023,715 A | * | 2/2000 | Burkes et al. | 715/207 |
| 6,256,192 B1 | * | 7/2001 | Shannon | 361/679.06 |
| 6,266,238 B1 | * | 7/2001 | Paulsel et al. | 361/679.27 |
| 6,366,453 B1 | * | 4/2002 | Wang et al. | 361/679.06 |
| 6,392,873 B1 | * | 5/2002 | Honda | 361/679.22 |
| 6,411,288 B1 | * | 6/2002 | Min | 345/204 |
| 6,487,069 B1 | * | 11/2002 | Onodera | 361/679.09 |
| 6,751,091 B2 | * | 6/2004 | Dighde et al. | 361/679.02 |
| 6,847,522 B2 | * | 1/2005 | Fan et al. | 361/679.55 |
| 7,092,248 B2 | * | 8/2006 | Shu | 361/679.21 |
| 7,180,731 B2 | * | 2/2007 | Titzler et al. | 361/679.22 |
| 7,233,486 B2 | | 6/2007 | Kim | |
| 7,433,179 B2 | * | 10/2008 | Hisano et al. | 361/679.27 |
| D593,091 S | * | 5/2009 | Behar et al. | D14/371 |
| D599,791 S | * | 9/2009 | Kuang et al. | D14/314 |
| 7,715,180 B2 | * | 5/2010 | Titzler et al. | 361/679.23 |
| 7,768,508 B2 | * | 8/2010 | Okuley | 345/204 |
| 2006/0055675 A1 | * | 3/2006 | Wilk et al. | 345/168 |
| 2006/0290812 A1 | * | 12/2006 | Hsu | 348/552 |
| 2007/0033297 A1 | * | 2/2007 | Hsu | 710/1 |
| 2007/0236873 A1 | * | 10/2007 | Yukawa et al. | 361/681 |
| 2009/0244012 A1 | * | 10/2009 | Behar et al. | 345/169 |

(Continued)

FOREIGN PATENT DOCUMENTS

CN  2444277 Y  8/2001

(Continued)

*Primary Examiner* — Lisa Lea Edmonds

(74) *Attorney, Agent, or Firm* — Muncy, Geissler, Olds & Lowe, PLLC

(57) ABSTRACT

This invention discloses a desktop computer and a method for manufacturing the same. The desktop computer includes a display device and a main body. The display device has a display side and a back side. One end of the main body is connected to the back side of the display device. The other end of the main body and the display device contact a surface where the desktop computer is disposed. The angle between the main body and the display device is adjustable.

26 Claims, 5 Drawing Sheets

U.S. PATENT DOCUMENTS

2009/0303676 A1* 12/2009 Behar et al. .............. 361/679.27
2010/0232103 A1* 9/2010 Chen ........................ 361/679.56

FOREIGN PATENT DOCUMENTS

| | | |
|---|---|---|
| CN | 1322991 A | 11/2001 |
| CN | 200947186 Y | 9/2007 |
| JP | 2004185164 | 7/2004 |
| JP | 2004240495 | 8/2004 |
| JP | 2009295138 A * | 12/2009 |
| TW | 426176 | 3/2001 |
| TW | 504110 | 9/2002 |
| TW | M242957 | 9/2004 |
| TW | M312183 | 5/2007 |

* cited by examiner

DESKTOP COMPUTER AND METHOD FOR MANUFACTURING THE SAME

CROSS REFERENCE TO RELATED APPLICATIONS

This Non-provisional application claims priority under 35 U.S.C. §119(a) on patent application Nos. 097120822 filed in Taiwan, Republic of China on Jun. 4, 2008, the entire contents of which are hereby incorporated by reference.

BACKGROUND OF THE INVENTION

1. Field of Invention

The invention relates to a desktop computer and, more particularly, to a desktop computer and a method for manufacturing the same.

2. Related Art

At present, desktop computers are widely used. A desktop computer mainly includes a display device for displaying images and a main body for driving the display device to display the images and performing a great deal of calculation and image processing. Since the display device and the main body are two independent components, at least an image transmission line is needed to connect the display device and the main body. However, the image transmission line is an external connecting line which is inconvenient to use. For example, the image transmission line occupies space and is inconvenient to transport, and further aesthetics is deteriorated. In addition, a supporting bracket is also needed to support the display device, thereby increasing the cost.

Since the development of the manufacturing processes for semiconductors promotes miniaturization of components, all-in-one desktop computers appear on the market. An all-in-one desktop computer is the computer that a main body and a display device thereof are integrated in the same casing and can perform their original functions. The all-in-one desktop computer does not occupy space and is convenient to transport. However, since the main body and the display device are integrated in a single casing, users fail to upgrade functions by themselves with the development of the technology and their needs, and manufacturers also need performing a complex disassembling and assembling process to repair the computer. In addition, a supporting bracket is also needed to support the all-in-one desktop computer, thereby increasing the cost.

SUMMARY OF THE INVENTION

This invention provides a desktop computer and a method for manufacturing the same. A supporting bracket is not needed to support the desktop computer. The desktop computer can also be easily disassembled and assembled for repair. Further, a user can upgrade functions or components of the desktop computer conveniently by himself or herself.

The invention provides a desktop computer without an additional supporting bracket to reduce manufacturing cost and a method for manufacturing the same.

According to one aspect of the invention, the desktop computer includes a display device and a main body. The display device has a display side and a back side. One end of the main body is connected to the back side of the display device. The other end of the main body and the display device contact a surface where the desktop computer is disposed. An adjustable angle is formed between the main body and the display device.

According to another aspect of the invention, the desktop computer includes a display device and a main body. The display device has a display surface and a back surface. One end of the main body is connected to the back surface of the display device. The display device contacts a surface by support of the main body.

The invention also discloses a method for manufacturing a desktop computer. The desktop computer includes a display device and a main body. The display device has a display side and a back side. One end of the main body is connected to the back side of the display device, and the other end of the main body and the display device contact a surface where the desktop computer is disposed. The angle between the main body and the display device is adjustable. The method includes the following steps. A selection instruction regarding the main body and the display device from a client is received. According to the selection instruction, a main body and a display device are obtained. One end of the main body is connected to the back side of the display device.

Since the main body and the display device connected with each other in the invention are two independent components, users can conveniently upgrade functions or components by themselves with the development of the technology and their needs, and the users can easily disassemble and assemble the desktop computer for repair. In addition, the display device in the invention is supported by the main body and thus an additional supporting bracket is not needed, thereby decreasing the manufacturing cost.

These and other features, aspects, and advantages of the present invention will become better understood with regard to the following description, appended claims, and accompanying drawings.

DETAILED DESCRIPTION OF THE INVENTION

Figure 1A:
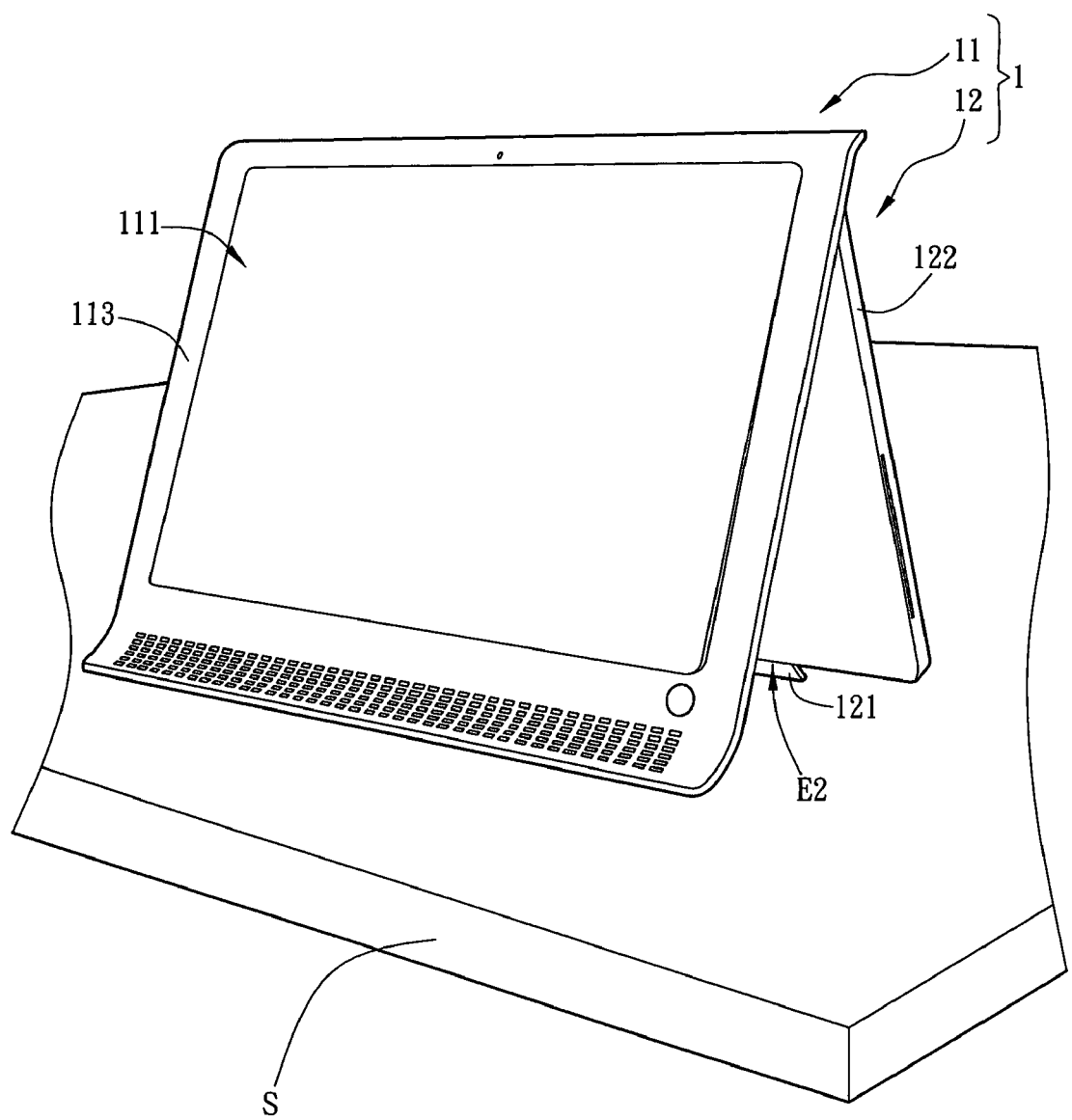
FIGS. 1A-1C are schematic diagrams of a desktop computer from different views according to a preferred embodiment of the invention.
Figure 1B:
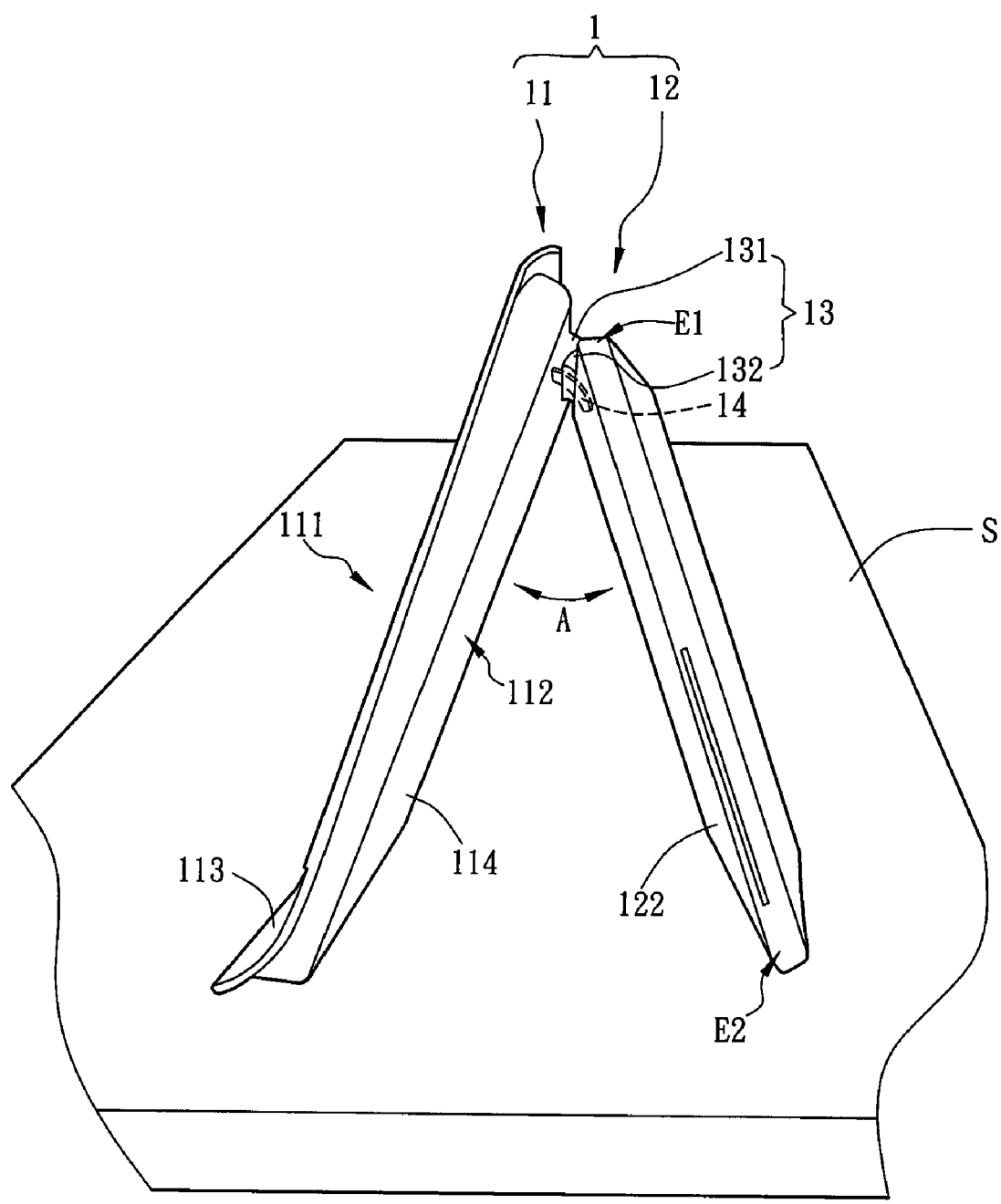
Figure 1C:
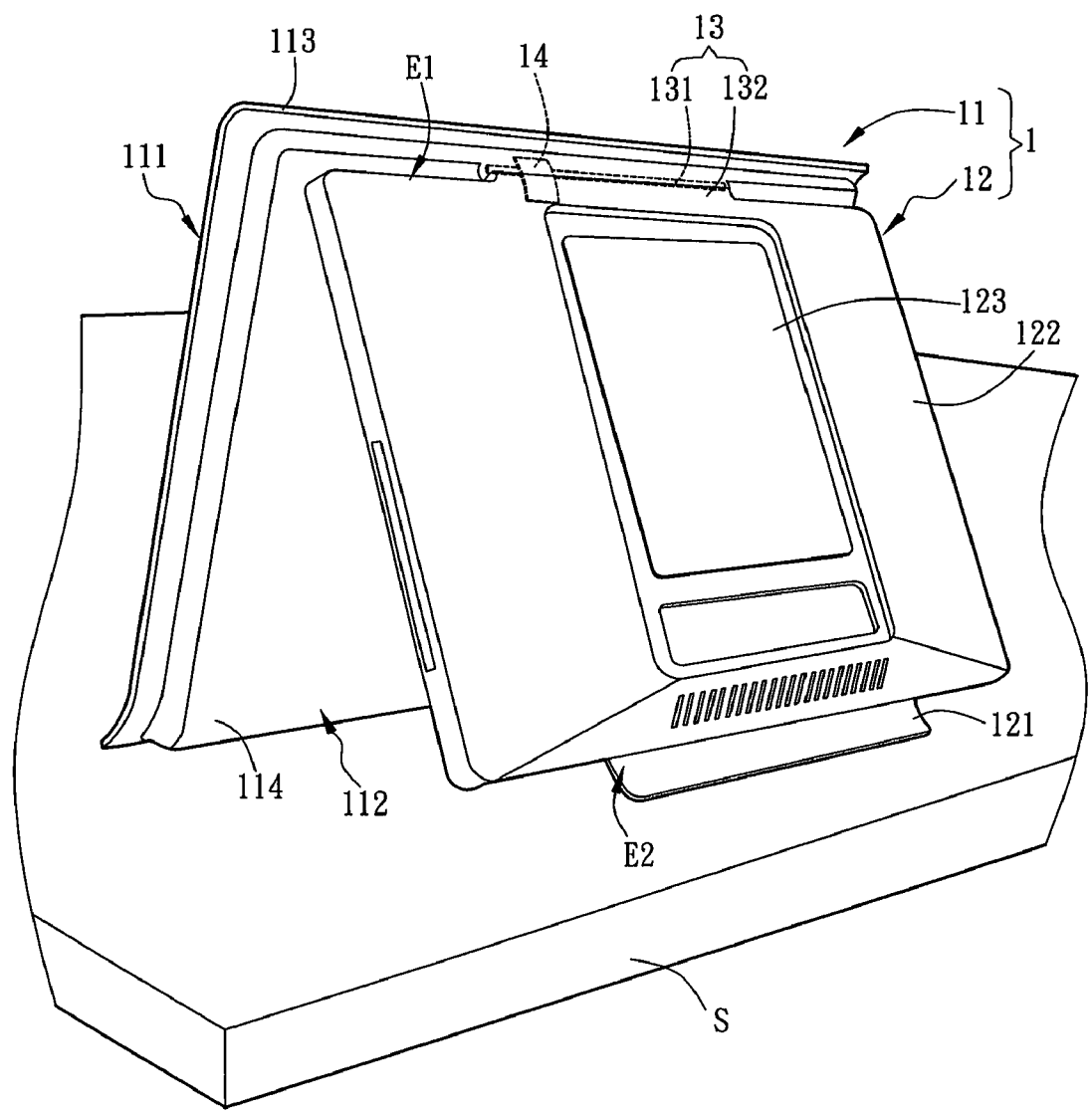

FIGS. 1A-1C are schematic diagrams of a desktop computer from different views according to a preferred embodiment of the invention. Please refer to FIGS. 1A-1C at the same time. In the embodiment, a desktop computer 1 includes a display device 11 and a main body 12.

The kind of the display device 11 in the embodiment is not limited. For example, the display device 11 may be a liquid crystal display device (LCD), a light-emitting diode (LED) display device, an organic electroluminescence (OEL) display device, a field emission display device (FED), or a surface-conduction electron-emitter display device (SED). The display device 11 has a display side 111 and a back side 112. The display 11 displays images at the display side 111. The back side 112 and the display side 111 are opposite to each other.

One end E1 of the main body 12 is connected to the back side 112 of the display device 11 and supports the display device 11. The display device 11 and the other end E2 of the main body 12 contact a surface S. The angle A is between the main body 12 and the display device 11 is adjustable. In the embodiment, the connection between the main body 12 and the display device 11 includes a mechanism connection and an electrical connection. The main body 12 is used to perform a great deal of calculation and image processing and to drive the display device 11 to display images. As the main body 12 has different functions, the main body 12 can include different components. For example, the main body 12 may include a central processing unit, an image processing unit, a memory unit, a storage unit, a read/write device and so on, or a combination thereof. The main body 12 may also include other components to perform other functions. For example, the main body 12 may include a wire transmission assembly and/or a wireless transmission assembly (such as a WI-FI assembly, a WIMAS assembly, or a Bluetooth assembly and so on) for exchanging data.

Since the main body 12 is disposed at the back side 112 of the display device 11, the main body 12 can be used as a supporting bracket for supporting the display device 11 thus to allow the display device 11 to contact the surface S. The form of the surface S is not limited. The surface S may be a plane, curved, or irregular one. In addition, the thickness of the main body 12 in the embodiment may be smaller than one-sixth width. Thus, the shape of the main body 12 is similar to that of the display device 11, and both the main body 12 and the display device 11 may be a thin cube to allow the main body 12 to support the display device 11 better.

The desktop computer 1 is described in detail hereinbelow.

The display device 11 has a front frame 113 disposed at the display side 111, and one portion of the front frame 113 contacts the surface S. In the embodiment, the front frame 113 may be disposed at the display side 111 in an engaging mode, an embedding mode, or a locking mode, and it is connected with other components of the display device 11. For example, the front frame 113 may be connected with a back cover 114 of the display device 11. Further, this connection can facilitate replacing the front frame 113 by a user thus to change the shape and/or color of the front frame 113. The contacting portion between the front frame 113 and the surface S may be curved, corrugated, zigzag, or linear, or it may have other shapes.

The main body 12 can also have a supporting element 121 contacting the surface S. The invention does not limit the shape of the supporting element 121. The supporting element 121 may be plane, corrugated, or zigzag, or it may have other shapes. The supporting element 121 can be connected with other components of the main body 12. For example, the supporting element 121 may be connected with a casing 122 of the main body 12 in an engaging mode, an embedding mode, or a locking mode and so on. Further, the user can replace the supporting element 121 by himself or herself.

The main body 12 can further have a cover 123 detachably connected to one side of the main body 12 back to the display device 11. The cover 123 may be engaged to, embedded into, or locked to the casing 122 of the main body 12. When the user is to replace the components in the main body 12, he or she can detach the cover 123 to upgrade or replace the interior components of the main body 12, such as a hard disk, a memory, or interface cards of the main body 12.

The desktop computer 1 can further include a connecting assembly 13 connecting the display device 11 and the main body 12. The angle A between the display device 11 and the main body 12 can be adjusted by the connecting assembly 13. For example, the angel A may be adjusted to be an acute, right, or obtuse one. In the embodiment, the connecting assembly 13 may be a hinge assembly and have a first connecting element 131 and a second connecting element 132. The first connecting element 131 is connected with the display device 11. In this embodiment, the first connecting element 131 and the display device 11 may be integrally formed.

The second connecting element 132 is connected with the main body 12. In this embodiment, the second connecting element 132 and the main body 12 may be integrally formed. In the embodiment, the second connecting element 132 is sleeved on the first connecting element 131.

In other embodiments, the connecting assembly 13 may have other forms. For example, the first connecting element 131 may be locked to or engaged to the display device 11, and the second connecting element 132 may be locked to or engaged to the main body 12. In addition, the angle A can also be limited. In the embodiment, the first connecting element 131 may interfere in rotation of the second connecting element 132 thus to limit the angle A. In addition, the display device 11 and the main body 12 can be positioned at different angles A. For example, the connecting assembly 13 may include a gear structure which controls the angle A by positioning the display device 11 and the main body 12 in the places corresponding to different gear numbers.

Figure 2:
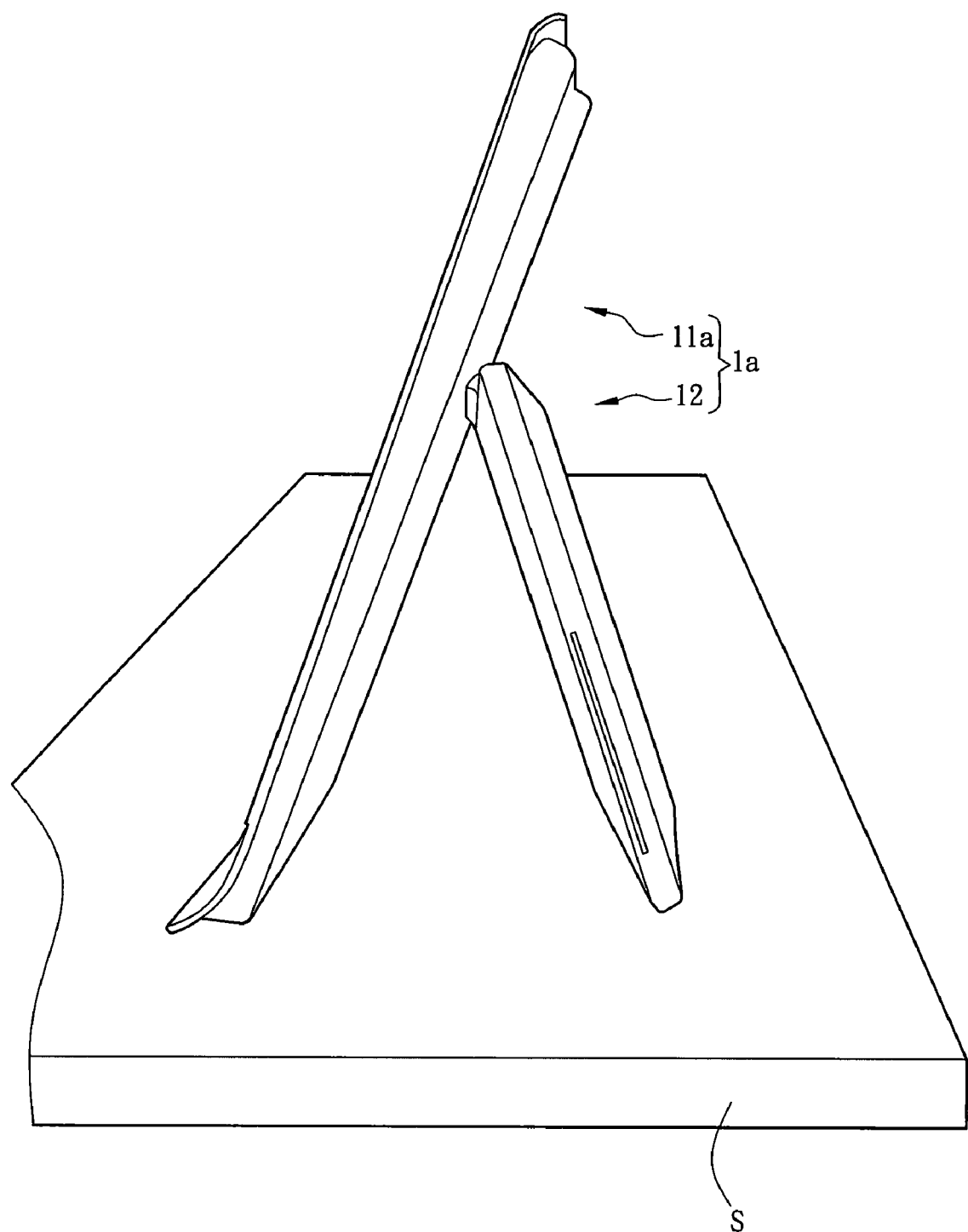
FIG. 2 is a schematic diagram of a desktop computer including another display device according to a preferred embodiment of the invention.

In addition, the connecting assembly 13 can be designed to allow users to conveniently detach and assemble the display device 11 and the main body 12. Thus, the users can replace the display device 11 and/or the main body 12 by themselves. FIG. 2 shows another desktop computer 1a including the main body 12 and another larger display device 11a.

In FIGS. 1A-1C, the desktop computer 1 further includes a conductive wire 14 which may be disposed in the connecting assembly 13 and electrically connected with the main body 12 and the display device 11. The conductive wire 14 may be a single wire or a flexible printed circuit, and it passes through the connecting assembly 13 and is electrically connected with main body 12 and the display device 11.

Figure 3:
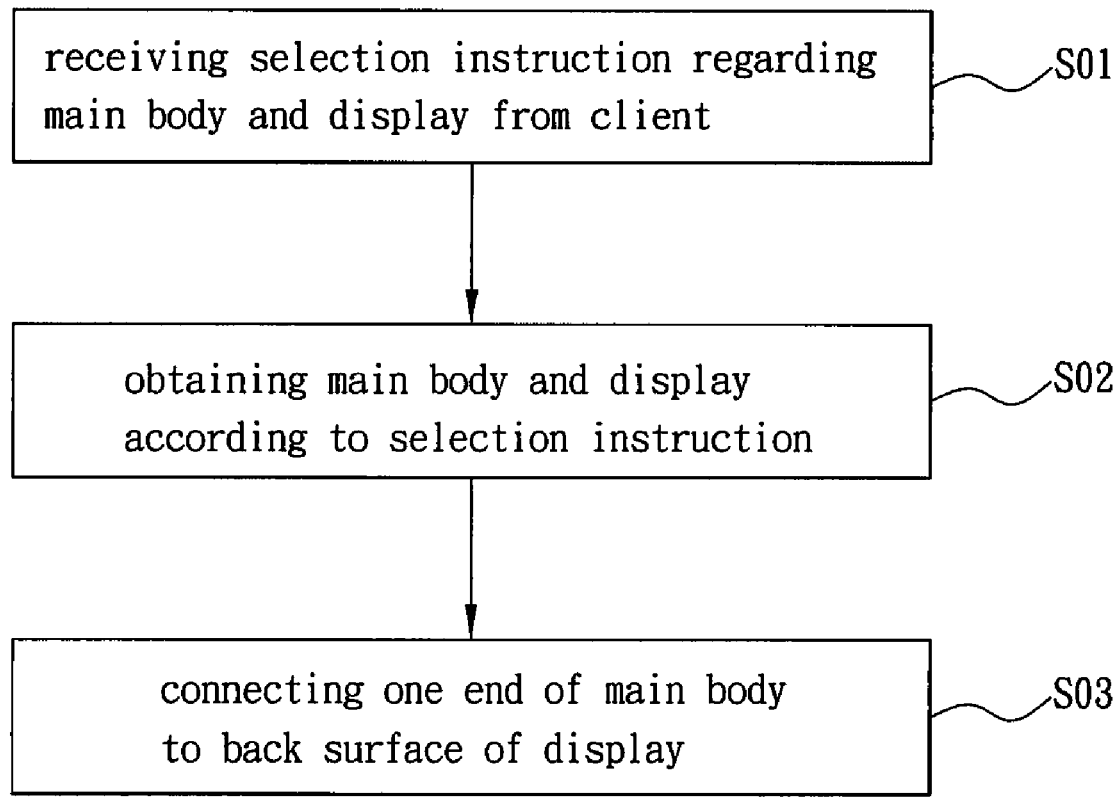
FIG. 3 is a flow chart of a method for manufacturing a desktop computer according to a preferred embodiment of the invention.

FIG. 3 is a flow chart of a method for manufacturing the desktop computer 1 according to a preferred embodiment of the invention. The manufacturing method includes steps S01 to S03. In step S01, a selection instruction regarding the main body and the display device from a client is received. First, since the display device 11 and the main body 12 of the desktop computer 1 in this embodiment are two independent components, the type of the main body 12 or the display device 11 can be selected for combination according to special needs of the client or standard products. The selection instruction may include a size and a color of the display device, a shape and a color of the front frame, a grade and a function of the main body and so on.

In step S02, according to the selection instruction, a main body 12 and a display device 11 are obtained. Since the main body 12 and the display device 11 are described in detail above, they are not described for a concise purpose. In addition, in other embodiments, according to the selection instruction, other main bodies or display devices, such as the display device 11a in FIG. 2, may be obtained.

In step S03, one end E1 of the main body 12 is connected to the back side 112 of the display device 11. Since the connection between the main body 12 and the display device 11 and the functions thereof are described in detail above, they are not described for a concise purpose. To facilitate transport of the manufactured desktop computer 1, the angle A between the main body 12 and the display device 11 can be adjusted to zero. When the client receives the computer, he or she can adjust the angle A as needed.

In addition, the method in the embodiment further includes the step of assembling the front frame 113 at the display side 111 to make one portion of the front frame 113 contact the surface S, the step of assembling the supporting element 121 at one side of the main body 12 to make the supporting element 121 contact the surface S, the step of detachably assembling the cover 123 at one side of the main body 12 back to the display device 11, or the step of adjusting the angle A between the main body 12 and the display device 11 by the connecting assembly 13 connecting the main body 12 and the display device 11. Since the steps of the method are described above in the description of the desktop computer 1, they are not described in detail here for a concise purpose.

To sum up, since the main body and the display device connected with each other in the invention are two independent components, the users can conveniently upgrade functions or components by themselves with the development of the technology and their needs, and the users can easily disassemble and assemble the desktop computer for repair. In addition, the display device in the invention is supported by the main body and thus an additional supporting bracket is not needed, thereby decreasing the manufacturing cost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A desktop computer comprising:
   a display device having a display side and a back side; and
   a main body, one end of the main body connected to the back side of the display device, the other end of the main body and the display device contacting a surface where the desktop computer is disposed, the angle between the main body and the display device being adjustable.

2. The desktop computer according to claim 1, wherein the display device has a front frame disposed at the display side, and one portion of the front frame contacts the surface.

3. The desktop computer according to claim 2, wherein the portion of the front frame is curved, corrugated, or zigzag.

4. The desktop computer according to claim 1, wherein the main body comprises a central processing unit, an image processing unit, a memory unit, a storage unit, a read/write device, or a combination thereof.

5. The desktop computer according to claim 1, wherein the main body has a supporting element contacting the surface.

6. The desktop computer according to claim 1, wherein the main body has a cover detachably connected to one side of the main body back to the display device.

7. The desktop computer according to claim 1, further comprising:
   a connecting assembly connecting the display device and the main body, the angle between the display device and the main body adjusted by the connecting assembly.

8. The desktop computer according to claim 7, wherein the connecting assembly has a first connecting element and a second connecting element connecting with each other, the first connecting element is connected with the display device, and the second connecting element is connected with the main body.

9. The desktop computer according to claim 7, wherein the connecting assembly is a hinge assembly.

10. The desktop computer according to claim 7, further comprising:
    a conductive wire disposed in the connecting assembly and electrically connected with the main body and the display device.

11. The desktop computer according to claim 1, wherein the angle is an acute angle.

12. A desktop computer comprising:
    a display device having a display side and a back side; and
    a main body, one end of the main body connected to the back side of the display device, the display device contacting a surface by support of the main body,
    wherein the display device has a front frame disposed at the display side, and one portion of the front frame contacts the surface.

13. The desktop computer according to claim 12, wherein the portion of the front frame is curved, corrugated, or zigzag.

14. The desktop computer according to claim 12, wherein the main body comprises a central processing unit, an image processing unit, a memory unit, a storage unit, a read/write device, or a combination thereof.

15. The desktop computer according to claim 12, wherein the main body has a supporting element contacting the surface.

16. The desktop computer according to claim 12, wherein the main body has a cover detachably connected to one side of the main body back to the display device.

17. The desktop computer according to claim 12, further comprising:
    a connecting assembly connecting the display device and the main body, an angle formed between the display device and the main body by the connecting assembly being an acute angle.

18. The desktop computer according to claim 17, wherein the connecting assembly has a first connecting element and a second connecting element connecting with each other, the first connecting element is connected with the display device, and the second connecting element is connected with the main body.

19. The desktop computer according to claim 17, wherein the connecting assembly is a hinge assembly.

20. The desktop computer according to claim 17, further comprising:
    a conductive wire disposed in the connecting assembly and electrically connected with the main body and the display device.

21. A method for manufacturing a desktop computer, the desktop computer including a display device and a main body, the display device having a display side and a back side, one end of the main body connected to the back side of the display device, the other end of the main body and the display device contacting a surface where the desktop computer is disposed, and the angle between the main body and the display device being adjustable, the manufacturing method comprising the steps of:
    receiving a selection instruction regarding the main body and the display device from a client;
    obtaining a main body and a display device according to the selection instruction; and
    connecting one end of the main body to the back side of the display device.

22. The method according to claim 21, wherein the selection instruction comprises a size and a color of the display device and a grade and a function of the main body.

23. The method according to claim 21, further comprising the step of:
    assembling a front frame at the display side, one portion of the front frame contacting the surface.

24. The method according to claim 21, further comprising the step of:
    adjusting the angle between the main body and the display device by a connecting assembly connecting the main body and the display device.

25. The method according to claim 21, further comprising the step of:

assembling a supporting element at one side of the main body to make the supporting element contact the surface.

26. The method according to claim 21, further comprising the step of:

detachably assembling a cover at one side of the main body back to the display device.

* * * * *